Patented Oct. 21, 1924.

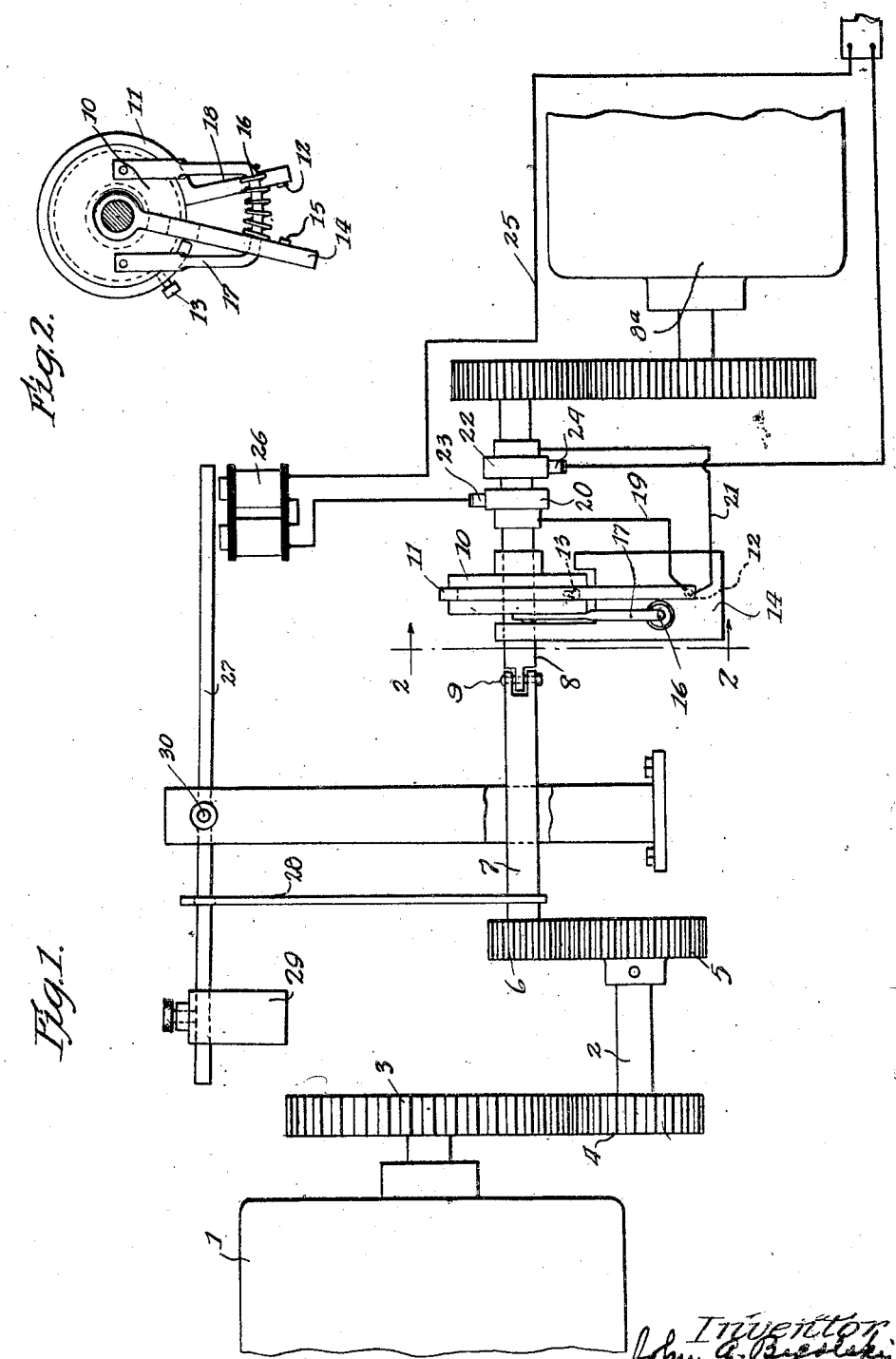

1,512,573

UNITED STATES PATENT OFFICE.

JOHN A. BIGALSKI, OF CHICAGO, ILLINOIS.

SPEED-CONTROLLING DEVICE.

Application filed August 4, 1921. Serial No. 489,858.

*To all whom it may concern:*

Be it known that I, JOHN A. BIGALSKI, a citizen of the United States, residing at Chicago, in the county of Cook and State of Illinois, have invented a certain new and useful Improvement in Speed-Controlling Devices, of which the following is a specification.

This invention relates to a new and improved device for connecting a variable speed motor and an electric generator. The invention has among other objects to provide a cheap, efficient apparatus by means of which a connection between a variable speed motor, such for example as a wind mill, and a device which must be driven at a substantially constant speed, such as a generator, may be regulated so as to secure this substantially constant speed for the driven device.

The invention has other objects which are more specifically pointed out in the following description.

Referring now to the accompanying drawings

Fig. 1 is a view more or less diagrammatic illustrating one form of device embodying the invention;

Fig. 2 is a sectional view taken on line 2—2 of Fig. 1.

Like numerals refer to like parts throughout the several figures.

In the drawings I have shown a variable speed motor 1, which may be any motor the speed of which varies from time to time. This motor is connected to shaft 2 in any suitable manner, as by means of a gear 3, and a pinion 4. The shaft 2 is provided with a gear 5 which engages a pinion 6 on the shaft 7. The shaft 7 is connected to shaft 8 by a universal joint 9 of any suitable description, the shaft 8 being connected with the driven device 8ª, such as a generator or other device which it is desired to drive. The shaft 7 is arranged so that it may be moved as hereinafter set out to disconnect the pinion 6 from the gear 5, and thus disconnect the motor 1 from the generator or other driven device. The shaft 8 has connected therewith a part 10 which rotates therewith. Connected with the part 10 is an adjustable ring 11 which carries an electric contact 12, and this ring may be adjusted around the part 10 and held in any desired position by the set screw 13. Associated with the part 10 is an air controlled part 14. This part is preferably mounted on the shaft 8 so as to be free to move in response to the air when the part 10 is rotated. An electric contact 15 is associated with the part 14 and is arranged so that when the part 14 is moved by the air a predetermined amount, the contact 15 will come in contact with the contact 12 and complete an electric circuit through an electromagnet hereinafter explained.

A spring 16 is arranged so as to resist the movement of the air controlled part 14, the spring being connected in any desired manner with the part 10, as by being mounted upon the support 17. It will be noted that as the air controlled part moves toward the contact 12, the spring 16 is compressed and that as the pressure of the air decreases, the spring 16 pushes the part 14 away and toward the stop 18, the spring acting when under compression to disconnect the contacts.

The contact 12 is electrically connected, as for example by the wire 19 with the ring 20 on the shaft 8, and the contact 15 is electrically connected as by means of the conductor 21 with the ring 22 on the shaft 8. The current is led to these rings in any suitable manner, as by the brushes 23 and 24, these brushes being connected in any suitable electric circuit.

If a generator is the driven device, it may be connected in circuit with the generator, or it may be connected in any outside circuit either when the driven device is a generator or some other machine.

The circuit 25 with which the brushes 23 and 24 are connected, includes an electromagnet 26. This electromagnet controls an arm 27 which is connected by a connecting piece 28 with the shaft 7. This arm is provided with a retracting device 29 which in this instance is shown as an adjustable weight. The arm 27 is shown as fulcrumed at 30. It will be seen that when the electromagnet 26 is energized, the arm 27 will be moved so as to lift the connecting piece 28, and hence the shaft 7, and disconnect the pinion 6 and the gear 5.

The use and operation of my invention are as follows:

When the motor 1 is operating it drives the shaft 7, the shaft 8 and the driven device 8ª. This rotates the part 10 and the contacts associated therewith. The pressure of the air due to this rotation tends to move the air controlled part 14 toward the contact 12, and the parts are so set and adjusted that when the desired speed of shaft 8 is reached, the air will move the air controlled part 14 so that contact 15 makes contact with contact 12. This connects the electromagnet 20 in an electrical circuit and causes it to be energized, the energizing of the magnet moving the arm 27 so as to lift the connecting piece 28 and the shaft 7 and disconnect the pinion 6 from the gear.

The speed of shaft 7 and shaft 8 now decreases due to the fact that they are disconnected from the motor 1, and the pressure of the air on the air controlled part 14 is thus decreased and the spring 16 moves the part 14 so as to disconnect contacts 12 and 15. The electromagnet 26 is then cut out of the circuit and de-energized, and the arm 27 and shaft 7 are moved so as to permit the pinion 6 to engage the gear 5, thus again connecting the shaft 8 and the driven device 8ª with the motor 1. When the speed again exceeds the predetermined speed, the pinion 6 and gear 5 are again disconnected as hereinbefore described.

It will thus be seen that the speed of shaft 8 and of the driven device is thus automatically controlled, and that this control is responsive to the air controlled part 14.

I claim:

1. A speed controlling device comprising a variable speed motor, a shaft driven therefrom, a disconnecting device intermediate the driven shaft and the motor for disconnecting the motor from said driven shaft, an electromagnet controlling said disconnecting device, and an air controlled part for controlling the circuit of said electromagnet.

2. A speed controlling device comprising a variable speed motor, a driven device driven thereby, a disconnecting device between said driven device and said motor for disconnecting the motor from the driven device, a rotating part located between the driven device and the point where the disconnecting device is disconnected from the motor, an electrical contact on said rotating part, a movable air controlled part connected with said rotating part, an electrical contact thereon, the two electrical contacts arranged so that when the rotating part reaches a predetermined speed the pressure of the air will force the two contacts into engagement, a retracting device for said air controlled part, an electric circuit connected with said contacts, an electromagnetic device in said circuit, and an operative connection between said electromagnetic device and said disconnecting device, whereby the disconnecting device is actuated when said contacts are brought into engagement.

3. A speed controlling device comprising a variable speed motor, a shaft driven thereby, a rotating part connected with said driven shaft, and separated contacts connected therewith, means responsive to the pressure of the air when the rotating part is rotated above a predetermined speed for bringing said contacts into engagement, an electric circuit connected with said contacts, an electromagnetic device in said electric circuit, a controlling device actuated by said electromagnetic device, and a disconnecting device with which said controlling device is connected, said disconnecting device when moved, disconnecting the motor from the driven shaft.

4. A speed controlling device comprising a variable speed motor, a driven shaft driven thereby, a disconnecting device between the driven shaft and the motor for disconnecting them, and air controlled actuating mechanism for moving the disconnecting device when the speed of the driven shaft rises above a predetermined amount, so as to disconnect the driven shaft from the motor.

5. A speed controlling device comprising a variable speed motor, a driven shaft driven thereby, a rotating part connected with said driven shaft, an electric contact connected therewith, a movable air controlled part carried by said rotating part, a contact connected therewith adapted to engage the contact on the rotating part when the pressure of the air on the air controlled part reaches a predetermined amount, an electromagnetic device connected with said electric contacts, a controlling mechanism for the disconnecting device actuated by said electromagnetic device, a spring opposing the movement of said air controlled part and adapted to be compressed thereby, said spring retracting the air controlled part when the pressure thereon falls below a predetermined amount.

6. A speed controlling device comprising a variable speed motor, a shaft connected therewith, a gear on said shaft, a movable shaft having a pinion connected with said gear and adapted when moved to disconnect said pinion and gear, a driven shaft connected with said movable shaft, an air controlled actuating device for moving said movable shaft so as to automatically disconnect said gear and pinion when the motor runs above a predetermined speed.

7. A speed controlling device comprising a variable speed driving shaft, a driven shaft, an intermediate shaft pivoted at one end and normally operatively connecting the driving shaft and the driven shaft, and electrically actuated means for moving said intermediate shaft to break the connection between the driven shaft and the driving shaft when the driven shaft reaches a predetermined speed.

Signed at Chicago, county of Cook and State of Illinois, this 21st day of July, 1921.

JOHN A. BIGALSKI.